United States Patent
Choe

(10) Patent No.: US 7,038,891 B2
(45) Date of Patent: May 2, 2006

(54) METHOD AND APPARATUS FOR PROVIDING PRECISE CONTROL OF MAGNETIC COUPLING FIELD IN NIMN TOP SPIN VALVE HEADS AND AMPLITUDE ENHANCEMENT

(75) Inventor: Geon Choe, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 21 days.

(21) Appl. No.: 10/038,125

(22) Filed: Jan. 2, 2002

(65) Prior Publication Data

US 2003/0123201 A1 Jul. 3, 2003

(51) Int. Cl.
*G11B 5/39* (2006.01)
(52) U.S. Cl. .............. 360/324.12; 29/603.14
(58) Field of Classification Search .......... 360/324.1, 360/324.11, 324.12; 29/603.07, 603.08, 29/603.13–603.16, 603.18
See application file for complete search history.

(56) References Cited

U.S. PATENT DOCUMENTS

| | | | |
|---|---|---|---|
| 5,432,734 | A | 7/1995 | Kawano et al. |
| 5,738,946 | A | 4/1998 | Iwasaki et al. |
| 5,764,056 | A | 6/1998 | Mao et al. |
| 5,849,422 | A | 12/1998 | Hayashi |
| 6,051,304 | A | 4/2000 | Takahashi |
| 6,452,761 | B1 * | 9/2002 | Carey et al. ............ 360/320 |
| 6,542,342 | B1 * | 4/2003 | Hayashi et al. ......... 360/324.2 |
| 6,700,754 | B1 * | 3/2004 | Kula et al. ............. 360/324.1 |

FOREIGN PATENT DOCUMENTS

| | | | |
|---|---|---|---|
| EP | 1124273 | * | 8/2001 |
| JP | 9-161243 | | 6/1997 |
| JP | 9-245320 | | 9/1997 |
| JP | 9-275233 | * | 10/1997 |
| JP | 10-256621 | | 9/1998 |
| JP | 10-303477 | | 11/1998 |
| JP | 11-87803 | | 3/1999 |

OTHER PUBLICATIONS

Egelhoff, Jr. et al., "Oxygen as a Surfactant in the Growth of Giant Magnetoresistance Spin Valves," J. Appl. Phys., 82, Dec. 15, 1997, pp. 6142-6151.

(Continued)

*Primary Examiner*—Angel Castro
(74) *Attorney, Agent, or Firm*—Chambliss, Bahner & Stophel, P.C.; David W. Lynch

(57) ABSTRACT

A method and apparatus for providing precise control of magnetic coupling field in NiMn top spin valve heads and amplitude enhancement is disclosed. The magnetic coupling between free and pinned layers in NiMn top spin valve heads is precisely controlled by employing the surface oxidation of Cu seed layer or/and Cu spacer layer that improve both the interfacial quality and the crystalline texture. According to the present invention the magnitude of coupling field can be precisely controlled without affecting resistance, and the amplitude of giant magneto-resistive(GMR) heads is improved by 15% at the same coupling field without affecting asymmetry performance. Thus, the present invention improves not only the interfacial roughness, but also improves the magnetic layer texture. The oxidation of Cu seed layer in the NiMn top spin valve structure provides more robust process with good control in coupling field that affects asymmetry of a GMR head.

12 Claims, 11 Drawing Sheets

OTHER PUBLICATIONS

Tolkes et al., "Surfactant-Induced Layer-by-Layer Growth on a Highly Anisotropic Substrate: Co/Cu(110)," Physical Review Letters, vol. 80, No. 13, Mar. 30, 1998, pp. 2877-2880.

Geon Choe, "Giant interface magnetostriction and temperature dependence in NiFe films encapsulated with Ta and Al2O3 layers," IEEE Trans. Mag. vol. 35(5), p. 3838, 1999.

* cited by examiner

|  | As-deposited free layer | | Annealed free layer at 250°, 5 hrs | |
| --- | --- | --- | --- | --- |
|  | $\lambda_i$ | $\lambda_b$ | $\lambda_i$ | $\lambda_b$ |
| Without oxidation | $6 \times 10^{-5}$ Å | $-3.2 \times 10^{-6}$ Å | $8 \times 10^{-5}$ Å | $-0.9 \times 10^{-6}$ Å |
| With Cu seed and spacer oxidation | $4 \times 10^{-5}$ Å | $-3.1 \times 10^{-6}$ Å | $4 \times 10^{-5}$ Å | $-1.5 \times 10^{-5}$ Å |

Fig. 7

METHOD AND APPARATUS FOR PROVIDING PRECISE CONTROL OF MAGNETIC COUPLING FIELD IN NIMN TOP SPIN VALVE HEADS AND AMPLITUDE ENHANCEMENT

BACKGROUND OF THE INVENTION

1. Field of the Invention

This invention relates in general to spin valve heads for magnetic storage systems, and more particularly to a method and apparatus for providing precise control of magnetic coupling field in NiMn top spin valve heads and amplitude enhancement.

2. Description of Related Art

Magnetic recording is a key and invaluable segment of the information-processing industry. While the basic principles are one hundred years old for early tape devices, and over forty years old for magnetic hard disk drives, an influx of technical innovations continues to extend the storage capacity and performance of magnetic recording products. For hard disk drives, the areal density or density of written data bits on the magnetic medium has increased by a factor of more than two million since the first disk drive was applied to data storage. Since 1991, areal density has grown by the well-known 60% compound growth rate, and this is based on corresponding improvements in heads, media, drive electronics, and mechanics.

Magnetic recording heads have been considered the most significant factor in areal-density growth. The ability of these components to both write and subsequently read magnetically recorded data from the medium at data densities well into the Gbits/in$^2$ range gives hard disk drives the power to remain the dominant storage device for many years to come.

The heart of a computer is an assembly that is referred to as a magnetic disk drive. The disk drive includes a rotating magnetic disk, write and read heads that are suspended by a suspension arm above the rotating disk and an actuator that swings the suspension arm to place the read and write heads over selected circular tracks on the rotating disk. The read and write heads are directly mounted on a slider that has an air-bearing surface (ABS). The suspension arm biases the slider into contact with the surface of the disk when the disk is not rotating. However, when the disk rotates, air is swirled by the rotating disk adjacent the ABS causing the slider to ride on an air bearing a slight distance from the surface of the rotating disk. The write and read heads are employed for writing magnetic impressions to and reading magnetic impressions from the rotating disk. The read and write heads are connected to processing circuitry that operates according to a computer program to implement the writing and reading functions.

A magnetoresistive (MR) sensor detects magnetic field signals through the resistance changes of a sensing element, fabricated of a magnetic material, as a function of the strength and direction of magnetic flux being sensed by the sensing element. Conventional MR sensors, such as those used as a MR read heads for reading data in magnetic recording disk drives, operate on the basis of the anisotropic magnetoresistive (AMR) effect of the bulk magnetic material, which is typically permalloy ($Ni_{81}Fe_{19}$). A component of the read element resistance varies as the square of the cosine of the angle between the magnetization direction in the read element and the direction of sense current through the read element. Recorded data can be read from a magnetic medium, such as the disk in a disk drive, because the external magnetic field from the recorded magnetic medium (the signal field) causes a change in the direction of magnetization in the read element, which in turn causes a change in resistance of the read element and a corresponding change in the sensed current or voltage.

In the past several years, prospects of even more rapid performance improvements have been made possible by the discovery and development of sensors based on the giant magnetoresistance (GMR) effect, also known as the spin-valve effect. Magnetic sensors utilizing the GMR effect, frequently referred to as "spin valve" sensors, typically involve a sandwiched structure consisting of two ferromagnetic layers separated by a thin non-ferromagnetic layer. One of the ferromagnetic layers is called the "pinned layer" because it is magnetically pinned or oriented in a fixed and unchanging direction by an adjacent anti-ferromagnetic layer, commonly referred to as the "pinning layer," through anti-ferromagnetic exchange coupling. The other ferromagnetic layer is called the "free" or "unpinned" layer because the magnetization is allowed to rotate in response to the presence of external magnetic fields.

The benefits of spin valve sensors result from the large change of conductance exhibited by the devices, which depends on the relative alignment between the magnetizations of the two ferromagnetic layers. In order to function effectively, a sufficient pinning field from the pinning layer is required to keep the pinned ferromagnetic layer's magnetization unchanged during operation of the GMR sensor. Thus far, various anti-ferromagnetic materials, such as FeMn, NiO, IrMn, PtPdMn, and TbCo, have been used as pinning layers for spin valve sensors. However, these materials have provided less than desirable results. For example, for FeMn pinning layers, the temperature (referred to as the blocking temperature) at which the pinning field disappears (or is greatly reduced) is very close to the typical sensor operating temperature of 100° C.–150° C. Therefore, at normal operating temperatures, an FeMn pinning layer typically does not provide a pinning field of sufficient strength to prevent the magnetization of the pinned ferromagnetic layer from rotating in the presence of an external magnetic field. Without sufficient pinning strength, the spin valve cannot function to its full potential. Further, materials such as FeMn and TbCo are susceptible to corrosion. Also, oxide materials such as NiO, which provide a low pinning field as well, are difficult to process. IrMn and PtPdMn are both expensive materials which provide pinning field strengths which are lower than is desired at normal operating temperatures.

NiMn has properties which make it desirable for use as an exchange bias layer material to stabilize magnetic sensors. See for example, Lin et al., "Improved Exchange Coupling Between Ferromagnetic Ni—Fe and Antiferromagnetic Ni—Mn-based Films," Appl. Phys. Lett., Vol. 65, No. 9, pp. 1183–1185, Aug. 29, 1994. See also, Lin et al., U.S. Pat. No. 5,315,468 entitled "Magnetoresistive Sensor Having Antiferromagnetic Layer for Exchange Bias." These references discuss the use of NiMn as an exchange bias layer material to stabilize the MR sensor layer. However, the exchange fields must be kept low to avoid pinning the sensor layer, which would drastically reduce its sensitivity. NiMn is capable of providing high exchange fields at temperatures far in excess of the pinning layer materials mentioned above. In addition to its ability to provide thermally stable exchange fields of high magnitude, NiMn is very corrosion-resistant. As taught by Lin et al., a NiMn layer having a thickness of around 500 Å can be used as an exchange bias layer adjacent to the MR sensor layer in a conventional MR sensor.

However, the thickness and structure required for the MR sensor of Lin et al. are not compatible with necessary spin valve sensor thickness and structures.

A problem with using NiMn as a pinning layer material in a spin valve sensor is that, as is well-known in the art, heating a spin valve sensor to temperatures greater than 225°–240° C. for more than 2–3 hours has resulted in inter-diffusion of the various layers and thus in destruction of the sensor. However, high annealing temperatures are necessary in order to realize the high pinning fields desired from the NiMn. The inter-diffusion between the layers during high temperature annealing has been an obstacle to using NiMn as a pinning layer in spin valve sensors. See for example, Devasahayam et al., "Exchange Biasing with NiMn," DSSC Spring '96 Review, Carnegie Mellon University.

Attempts in the prior art to create a spin valve sensor having NiMn as a pinning layer have failed. For example, Devasahayam et al. describe one such failed attempt in which the NiMn pinning layer is pre-annealed prior to depositing the NiFe ferromagnetic layer of the spin valve sensor. Devasahayam et al. describe another attempt to use NiMn as a pinning layer material in a spin valve sensor in which a bi-layer of NiMn and NiFe are pre-annealed. Next, the layer of NiFe is sputter etched away, and a new NiFe ferromagnetic layer is deposited on top of the NiMn pinning layer. While some success was reported in this second attempted method, the device reported by Devasahayam et al. requires a NiFe ferromagnetic layer thickness of 250 Å and a NiMn pinning layer thickness of 500 Å, while achieving a pinning field of only 100 Oe.

Thus, in addition to providing insufficient pinning strengths, the thicknesses of the layers required by Devasahayam et al. are incompatible with spin valve sensor requirements. Further, the process of annealing and sputter etching the layer of NiFe and redepositing the layer of NiFe is not practical for use in producing spin valve sensors. Therefore, there is a need for a spin valve sensor with thermally stable high pinning fields.

Spin valve sensors have been developed that include a first layer of ferromagnetic material and a second layer of ferromagnetic material, with the second layer of ferromagnetic material having a thickness of less than about 100 Å. A first layer of non-ferromagnetic conducting material is positioned between the first and second layers of ferromagnetic material. A NiMn pinning layer is positioned adjacent to the second layer of ferromagnetic material such that the pinning layer is in contact with the second layer of ferromagnetic material, wherein the NiMn pinning layer has a thickness of less than about 200 Å and provides a pinning field for pinning a magnetization of the second layer of ferromagnetic material in a first direction.

However, In such NiMn top spin valve heads, the Cu seed layer prior to deposition of magnetic free layers plays an important role in affecting the magnetic coupling field and amplitude. With increasing Cu seed layer thickness, the ferromagnetic coupling field decreases sharply and stays constant at 13 Å of Cu thickness, while the GMR effect increases up to 20 Å of Cu thickness due to spin filtering effect. Typically the ferromagnetic coupling field of NiMn spin valve heads with 15 Å thick Cu seed layer is 8–10 Oe and is difficult to be adjusted unless the Cu spacer thickness is changed. The precise control of magnetic coupling field is important in yielding high performance heads, since the coupling field sensitively affects the head performance such as asymmetry, amplitude and asymmetry uniformity within the wafer. Besides, it is difficult to fabricate the head having a negative coupling field using a NiMn spin valve structure because of interdiffusion of free and pinned layers during high temperature annealing process (e.g., ~250° C.)

It can be seen that there is a need for a method and apparatus for providing precise control of magnetic coupling field in NiMn top spin valve heads and amplitude enhancement.

SUMMARY OF THE INVENTION

To overcome the limitations in the prior art described above, and to overcome other limitations that will become apparent upon reading and understanding the present specification, the present invention discloses a method and apparatus for providing precise control of magnetic coupling field in NiMn top spin valve heads and amplitude enhancement.

The present invention solves the above-described problems by precisely controlling the magnetic coupling between free and pinned layers in NiMn top spin valve heads by employing the surface oxidation of Cu seed layer or/and Cu spacer layer that improve both the interfacial quality and the crystalline texture. According to the present invention the magnitude of coupling field can be precisely controlled without affecting resistance, and the amplitude of giant magneto-resistive(GMR) heads is improved by 15% at the same coupling field, i.e., asymmetry performance.

A method in accordance with the principles of the present invention includes forming at least one copper layer in a NiMn top spin valve, oxidizing the at least one copper layer and depositing remaining layers of the NiMn top spin valve head.

Other embodiments of a method in accordance with the principles of the invention may include alternative or optional additional aspects. One such aspect of the method of the present invention is that the at least one copper layer is naturally oxidized for 80 seconds under $8 \times 10^{-5}$ Torr of oxygen pressure.

Another aspect of the method of the present invention is that the at least one oxidized copper layer reduces the ferromagnetic coupling field without deteriorating GMR effect or resistance.

Another aspect of the method of the present invention is that the at least one oxidized copper layer provides a negative coupling field without affecting GMR effect or resistance.

Another aspect of the present invention is that the at least one oxidized copper layer changes the crystalline texture growth of subsequent magnetic layers.

Another aspect of the method of the present invention is that at least one oxidized copper layer provides a negative coupling field that is achieved without affecting a GMR effect or resistance of the NiMn top spin valve head.

Another aspect of the method of the present invention is that the at least one oxidized copper layer provides stronger growth of NiFe(111) and NiMn(111) with respect to NiFe (200) and NiMn(002) phases.

Another aspect of the method of the present invention is that the at least one oxidized copper layer improves the interfacial roughness.

Another aspect of the method of the present invention is that the at least one copper layer is oxidized prior to deposition of magnetic free layers.

Another aspect of the method of the present invention is that the at least one oxidized copper layer comprises a copper seed layer.

Another aspect of the method of the present invention is that the at least one oxidized copper layer further comprises a copper spacer layer.

Another aspect of the method of the present invention is that the oxidation of at least one copper layer provides an approximately 15% increase in amplitude of the output of a NiMn spin valve head at the same coupling field.

Another aspect of the method of the present invention is that the oxidation of at least one copper layer does not affect asymmetry performance.

In another embodiment of the present invention, a NiMn top spin valve sensor is disclosed. The NiMn top spin valve sensor includes a substrate, a copper seed layer structure disposed on the substrate, a ferromagnetic free layer having a magnetic moment that is free to rotate from a first direction in response to a signal field, a ferromagnetic pinned layer structure having a magnetic moment, a nonmagnetic electrically conductive spacer layer of copper located between the free layer and the pinned layer structure and a NiMn antiferromagnetic pinning layer exchange coupled to the pinned layer structure for pinning the magnetic moment of the pinned layer structure in a second direction, wherein at least one of the copper seed layer and the nonmagnetic electrically conductive spacer layer of copper is oxidized after deposition and before a subsequent layer is disposed thereon.

Another aspect of the NiMn top spin valve sensor according to the present invention is that at least one of the copper seed layer and the nonmagnetic electrically conductive spacer layer of copper is naturally oxidized for 80 seconds under $8 \times 10^{-5}$ Torr of oxygen pressure.

Another aspect of the NiMn top spin valve sensor according to the present invention is that both the copper seed layer and the nonmagnetic electrically conductive spacer layer of copper are oxidized after deposition and before a subsequent layer is deposited thereon.

Another aspect of the NiMn top spin valve sensor according to the present invention is that oxidation of at least one of the copper seed layer and the nonmagnetic electrically conductive spacer layer of copper reduces the ferromagnetic coupling field without deteriorating GMR effect or resistance.

Another aspect of the NiMn top spin valve sensor according to the present invention is that oxidation of at least one of the copper seed layer and the nonmagnetic electrically conductive spacer layer of copper provides a negative coupling field without affecting GMR effect or resistance.

Another aspect of the NiMn top spin valve sensor according to the present invention is that oxidation of at least one of the copper seed layer and the nonmagnetic electrically conductive spacer layer of copper changes the crystalline texture growth of subsequent magnetic layers.

Another aspect of the NiMn top spin valve sensor according to the present invention is that oxidation of at least one of the copper seed layer and the nonmagnetic electrically conductive spacer layer of copper results in stronger growth of NiFe(111) and NiMn(111) with respect to NiFe(200) and NiMn(002) phases.

Another aspect of the NiMn top spin valve sensor according to the present invention is that oxidation of at least one of the copper seed layer and the nonmagnetic electrically conductive spacer layer of copper improves the interfacial roughness.

Another aspect of the NiMn top spin valve sensor according to the present invention is that oxidation of at least one of the copper seed layer and the nonmagnetic electrically conductive spacer layer of copper provides an approximately 15% increase in amplitude of the output of a NiMn spin valve head at the same coupling field.

Another aspect of the NiMn top spin valve sensor according to the present invention is that oxidation of at least one of the copper seed layer and the nonmagnetic electrically conductive spacer layer of copper does not affect asymmetry performance.

Another aspect of the NiMn top spin valve sensor according to the present invention is that the at least one oxidized copper layer reduces the ferromagnetic coupling field without deteriorating GMR effect or resistance.

In another embodiment of the present invention, a magnetic storage system is disclosed. The magnetic storage system includes a magnetic recording medium, a NiMn top spin valve sensor disposed proximate the recording medium, an actuator for moving the NiMn top spin valve sensor across the magnetic recording medium so the NiMn top spin valve sensor may access different regions of magnetically recorded data on the magnetic recording medium and a data channel coupled electrically to the NiMn top spin valve sensor for detecting changes in resistance of the NiMn top spin valve sensor caused by rotation of the magnetization axis of the free ferromagnetic layer relative to the fixed magnetization of the pinned layer in response to magnetic fields from the magnetically recorded data, the NiMn top spin valve sensor including a substrate, a copper seed layer structure disposed on the substrate, a ferromagnetic free layer having a magnetic moment that is free to rotate from a first direction in response to a signal field, a ferromagnetic pinned layer structure having a magnetic moment, a nonmagnetic electrically conductive spacer layer of copper located between the free layer and the pinned layer structure and a NiMn antiferromagnetic pinning layer exchange coupled to the pinned layer structure for pinning the magnetic moment of the pinned layer structure in a second direction, wherein at least one of the copper seed layer and the nonmagnetic electrically conductive spacer layer of copper is oxidized after deposition and before a subsequent layer is disposed thereon, Another aspect of the magnetic storage system of the present invention is that at least one of the copper seed layer and the nonmagnetic electrically conductive spacer layer of copper is naturally oxidized for 80 seconds under $8 \times 10^{-5}$ Torr of oxygen pressure.

Another aspect of the magnetic storage system of the present invention is that both the copper seed layer and the nonmagnetic electrically conductive spacer layer of copper are oxidized after deposition and before a subsequent layer is disposed thereon.

Another aspect of the magnetic storage system of the present invention is that oxidation of at least one of the copper seed layer and the nonmagnetic electrically conductive spacer layer of copper reduces the ferromagnetic coupling field without deteriorating GMR effect or resistance.

Another aspect of the magnetic storage system of the present invention is that oxidation of at least one of the copper seed layer and the nonmagnetic electrically conductive spacer layer of copper provides a negative coupling field without affecting GMR effect or resistance.

Another aspect of the magnetic storage system of the present invention is that oxidation of at least one of the copper seed layer and the nonmagnetic electrically conductive spacer layer of copper changes the crystalline texture growth of subsequent magnetic layers.

Another aspect of the magnetic storage system of the present invention is that oxidation of at least one of the copper seed layer and the nonmagnetic electrically conductive spacer layer of copper results in stronger growth of NiFe(111) and NiMn(111) with respect to NiFe(200) and NiMn(002) phases.

Another aspect of the magnetic storage system of the present invention is that oxidation of at least one of the copper seed layer and the nonmagnetic electrically conductive spacer layer of copper improves the interfacial roughness.

Another aspect of the magnetic storage system of the present invention is that oxidation of at least one of the copper seed layer and the nonmagnetic electrically conductive spacer layer of copper provides an approximately 15% increase in amplitude of the output of a NiMn spin valve head at the same coupling field.

Another aspect of the magnetic storage system of the present invention is that oxidation of at least one of the copper seed layer and the nonmagnetic electrically conductive spacer layer of copper does not affect asymmetry performance.

Another aspect of the magnetic storage system of the present invention is that the at least one oxidized copper layer reduces the ferromagnetic coupling field without deteriorating GMR effect or resistance.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 7 is a table showing the effect of the surface oxidation of the copper layers according to the present invention;

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method and apparatus for providing precise control of magnetic coupling field in NiMn top spin valve heads and amplitude enhancement. The present invention solves the above-described problems by precisely controlling the magnetic coupling between free and pinned layers in NiMn top spin valve heads by employing the surface oxidation of Cu seed layer or/and Cu spacer layer that improve both the interfacial quality and the crystalline texture. According to the present invention the magnitude of coupling field can be precisely controlled without affecting resistance, and the amplitude of giant magneto-resistive(GMR) heads is improved by 15% at the same coupling field or asymmetry value. Thus, the present invention improves not only the interfacial roughness, but also improves the magnetic layer texture. The oxidation of Cu seed layer in the NiMn top spin valve structure provides more robust process with good control in coupling field.

Figure 1:
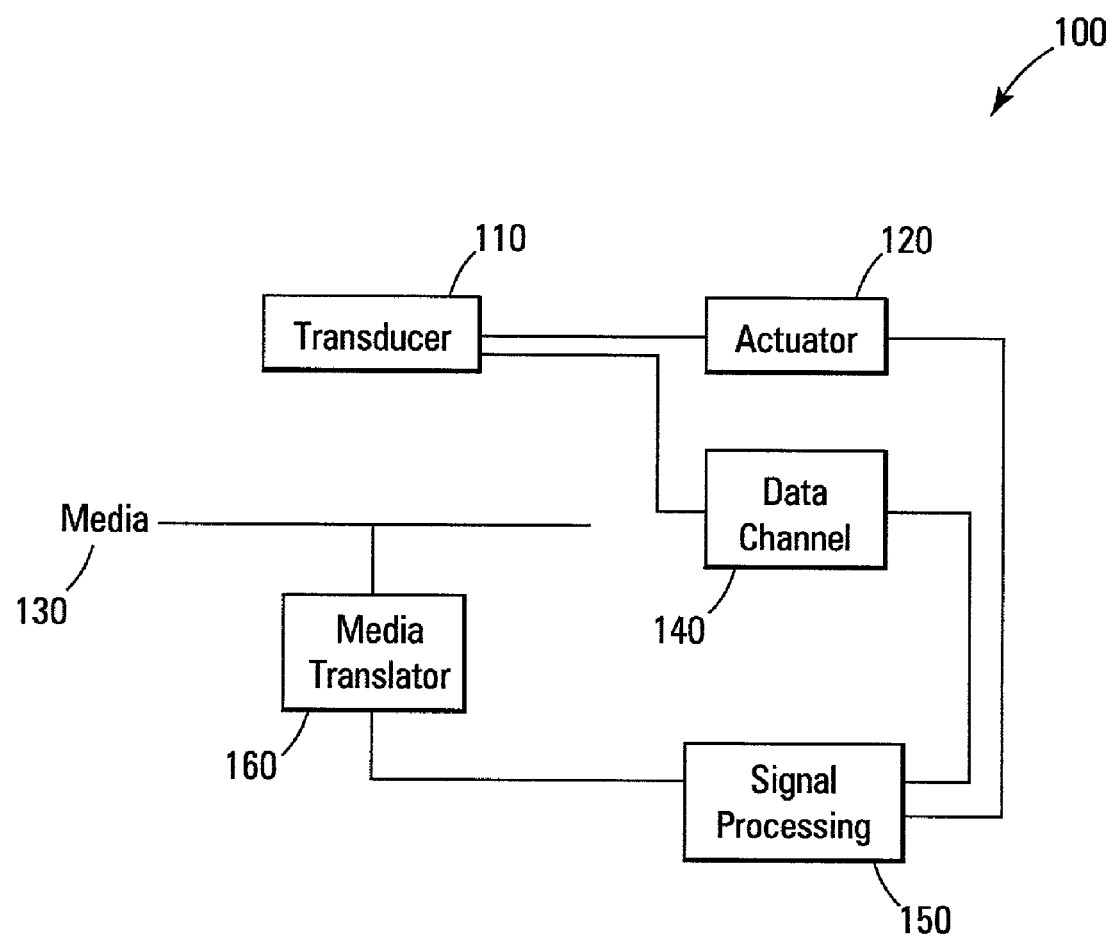
FIG. 1 illustrates a storage system according to the present invention.

FIG. 1 illustrates a storage system 100 according to the present invention. In FIG. 1, a transducer 110 is under control of an actuator 120. The actuator 120 controls the position of the transducer 110. The transducer 110 writes and reads data on magnetic media 130. The read/write signals are passed to a data channel 140. A system processor 150 controls the actuator 120 and processes the signals of the data channel 140. In addition, a media translator 160 is controlled by a system processor 150 to cause the magnetic media 130 to move relative to the transducer 110. The present invention is not meant to be limited to a particular type of storage system 100 or to the type of media 130 used in the storage system 100.

Figure 2:
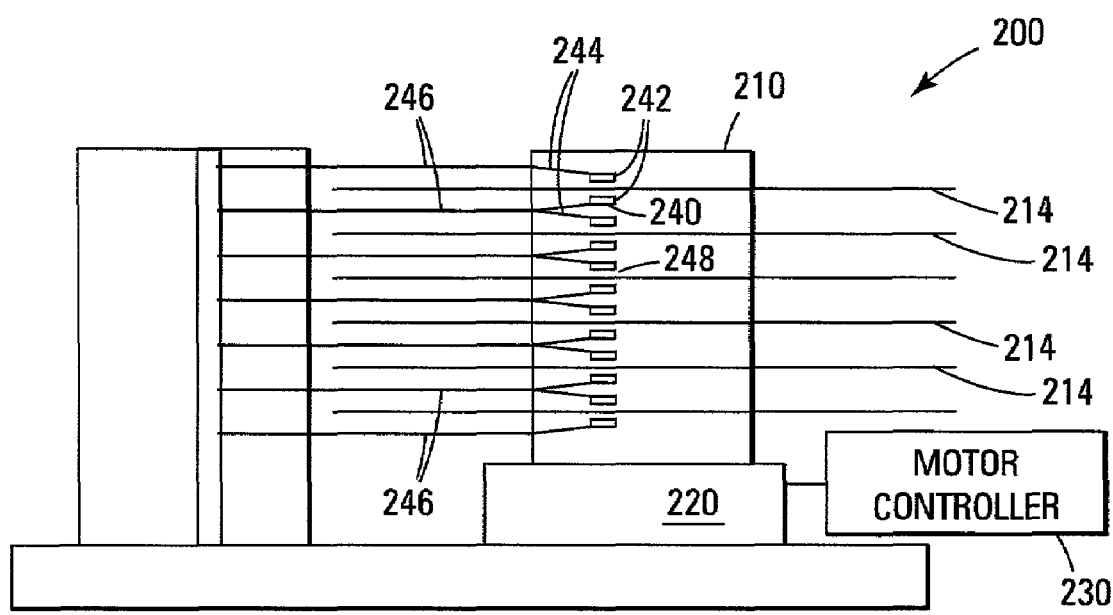
FIG. 2 illustrates one particular embodiment of a storage system according to the present invention.

FIG. 2 illustrates one particular embodiment of a storage system 200 according to the present invention. In FIG. 2, a hard disk drive 200 is shown. The drive 200 includes a spindle 210 that supports and rotates a magnetic disk 214. The spindle 210 is rotated by a motor 220 that is controlled by a motor controller 230. A combined read and write magnetic head 240 is mounted on a slider 242 that is supported by a suspension 244 and actuator arm 246. Processing circuitry 250 exchanges signals, representing such information, with the head 240, provides motor drive signals for rotating the magnetic disk 214, and provides control signals for moving the slider to various tracks. A plurality of disks 214, sliders 242 and suspensions 244 may be employed in a large capacity direct access storage device (DASD).

The suspension 244 and actuator arm 246 position the slider 242 so that the magnetic head 240 is in a transducing relationship with a surface of the magnetic disk 214. When the disk 214 is rotated by the motor 220 the slider 240 is supported on a thin cushion of air (air bearing) between the surface of the disk 214 and the air-bearing surface (ABS) 248. The magnetic head 240 may then be employed for writing information to multiple circular tracks on the surface of the disk 214, as well as for reading information therefrom.

Figure 3:
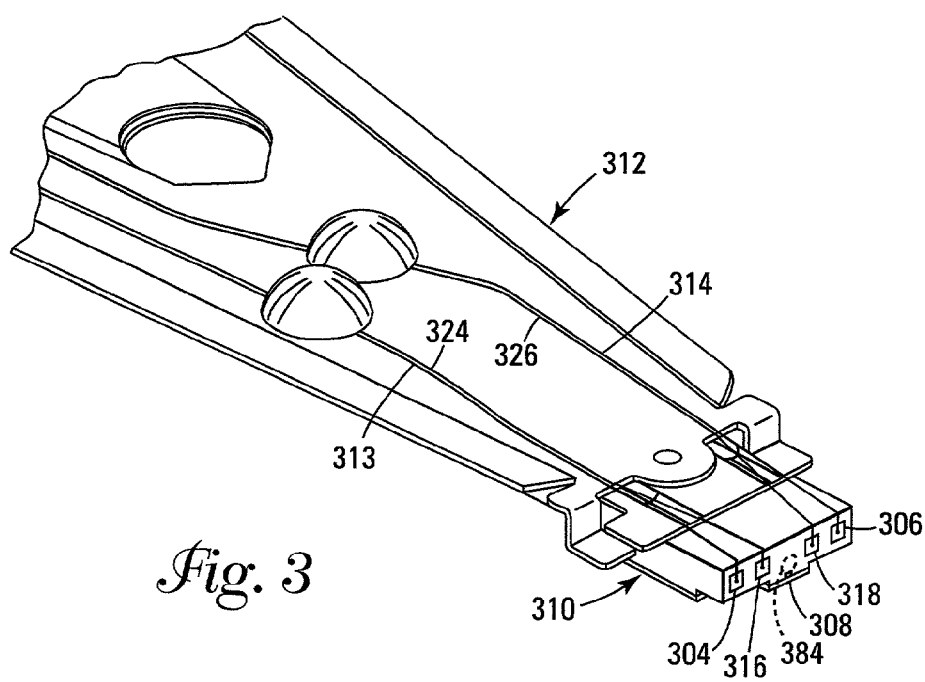
FIG. 3 illustrates a slider mounted on a suspension.

FIG. 3 illustrates a slider 310 mounted on a suspension 312. In FIG. 3 first and second solder connections 304 and 306 connect leads from the sensor 308 to leads 313 and 314 on the suspension 312 and third and fourth solder connections 316 and 318 connect the coil 384 to leads 324 and 326 on the suspension.

Figure 4:
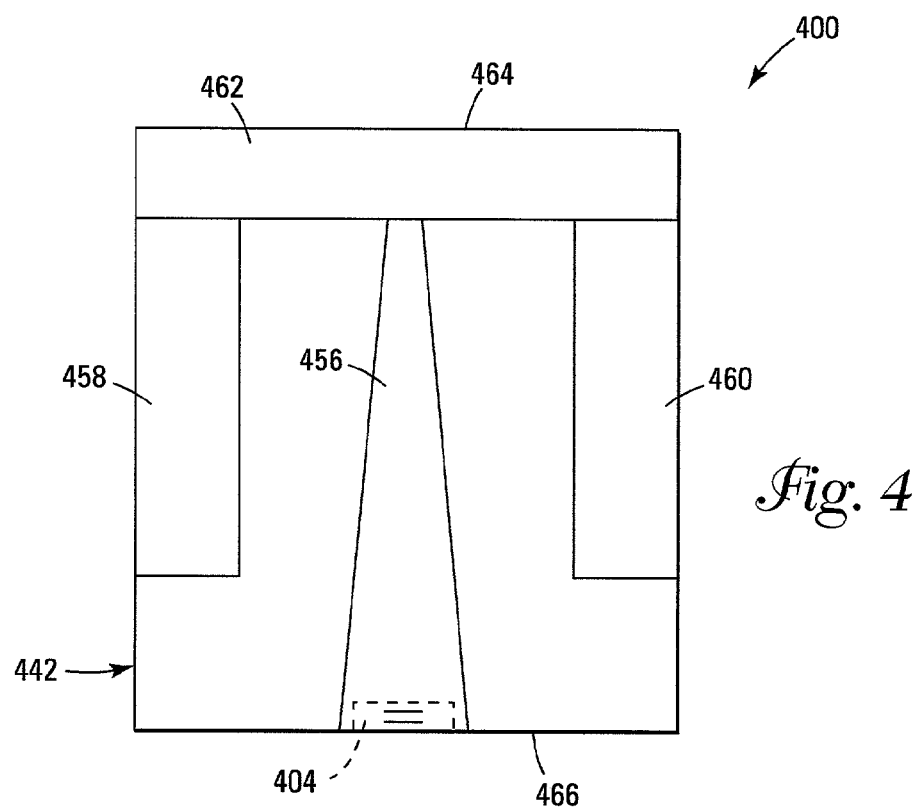
FIG. 4 is an ABS view of the slider and the magnetic head.

FIG. 4 is an ABS view of the slider 400 and the magnetic head 404. The slider has a center rail 456 that supports the magnetic head 404, and side rails 458 and 460. The rails 456, 458 and 460 extend from a cross rail 462. With respect to rotation of a magnetic disk, the cross rail 462 is at a leading edge 464 of the slider and the magnetic head 404 is at a trailing edge 466 of the slider.

Figure 5:
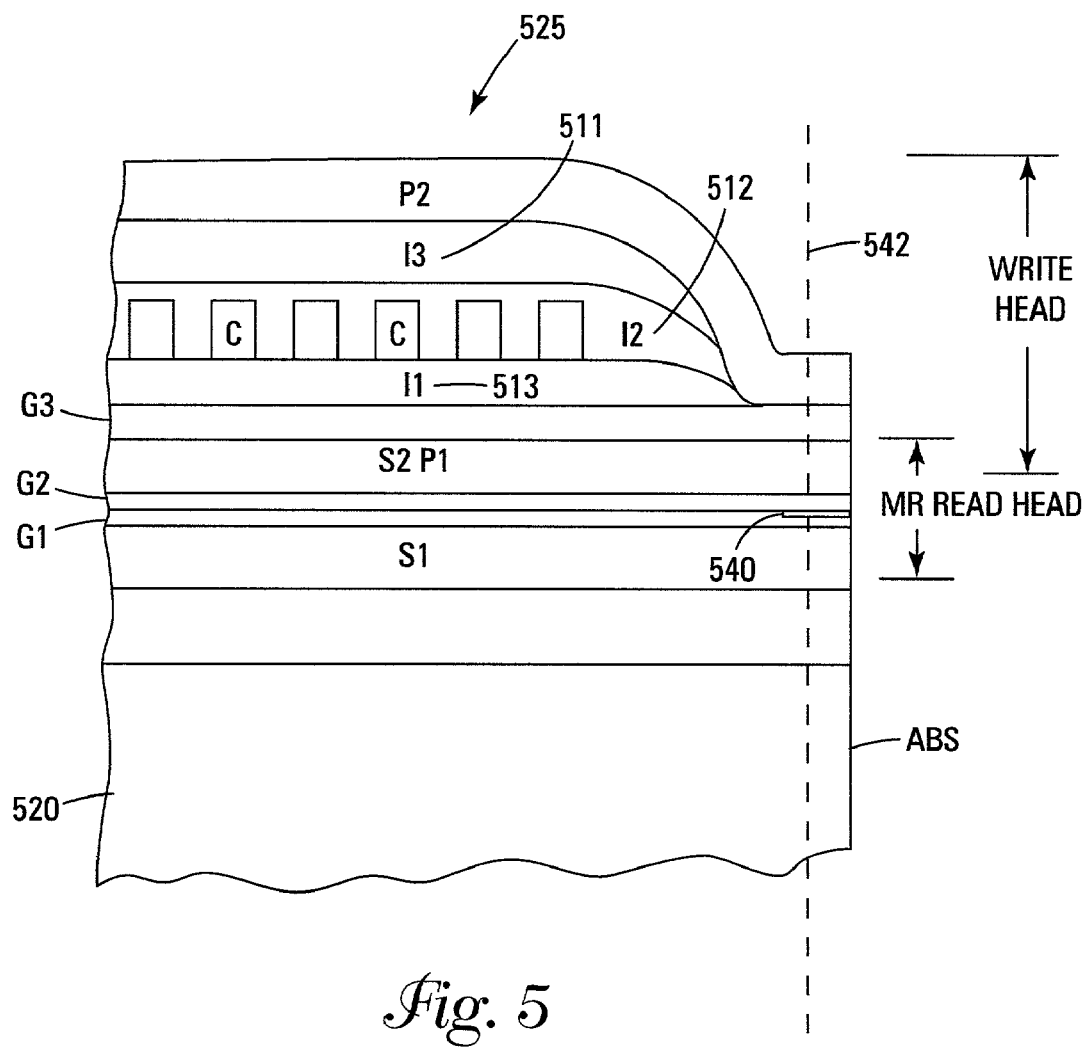
FIG. 5 is a cross-sectional schematic view of the integrated read/write head which includes a MR read head portion and an inductive write head portion.

FIG. 5 is a cross-sectional schematic view of the integrated read/write head 525 which includes a MR read head portion and an inductive write head portion. The head 525 is lapped to form an air-bearing surface (ABS), the ABS being spaced from the surface of the rotating disk by the air bearing as discussed above. The read head includes a MR sensor 540 sandwiched between first and second gap layers G1 and G2 which are, in turn, sandwiched between first and second magnetic shield layers S1 and S2. In a conventional disk drive, the MR sensor 540 is an AMR sensor. The write head includes a coil layer C and insulation layer 512 which are sandwiched between insulation layers 511 and 513 which are, in turn, sandwiched between first and second pole pieces P1 and P2. A gap layer G3 is sandwiched between the first and second pole pieces P1, P2 at their pole tips adjacent to the ABS for providing a magnetic gap. During writing, signal current is conducted through the coil layer C and flux is induced into the first and second pole layers P1, P2 causing flux to fringe across the pole tips at the ABS. This flux magnetizes circular tracks on the rotating disk during a write operation. During a read operation, magnetized regions on the rotating disk inject flux into the MR sensor 540 of the read head, causing resistance changes in the MR sensor 540. These resistance changes are detected by detecting voltage changes across the MR sensor 540. The combined head 525 shown in FIG. 5 is a "merged" head in which the second shield layer S2 of the read head is employed as a first pole piece P1 for the write head. In a piggyback head (not shown), the second shield layer S2 and the first pole piece P1 are separate layers.

The above description of a typical magnetic recording disk drive with an AMR read head, and the accompanying FIGS. 1–5, are for representation purposes only. Disk drives may contain a large number of disks and actuators, and each actuator may support a number of sliders. In addition, instead of an air-bearing slider, the head carrier may be one which maintains the head in contact or near contact with the disk, such as in liquid bearing and other contact and near-contact recording disk drives.

As mentioned above, NiMn has properties which make it desirable for use as an exchange bias layer material to stabilize magnetic sensors. In such NiMn top spin valve heads, an appropriate crystallographic texture of seed and underlayers prior to deposition of magnetic free, pinned and pinning NiMn layers are critical in determining coupling field as well as NiMn pinning field. According to the present invention, the NiMn top spin valve heads includes copper seed layers for enhancing GMR amplitude through spin filtering effect.

Figure 6:
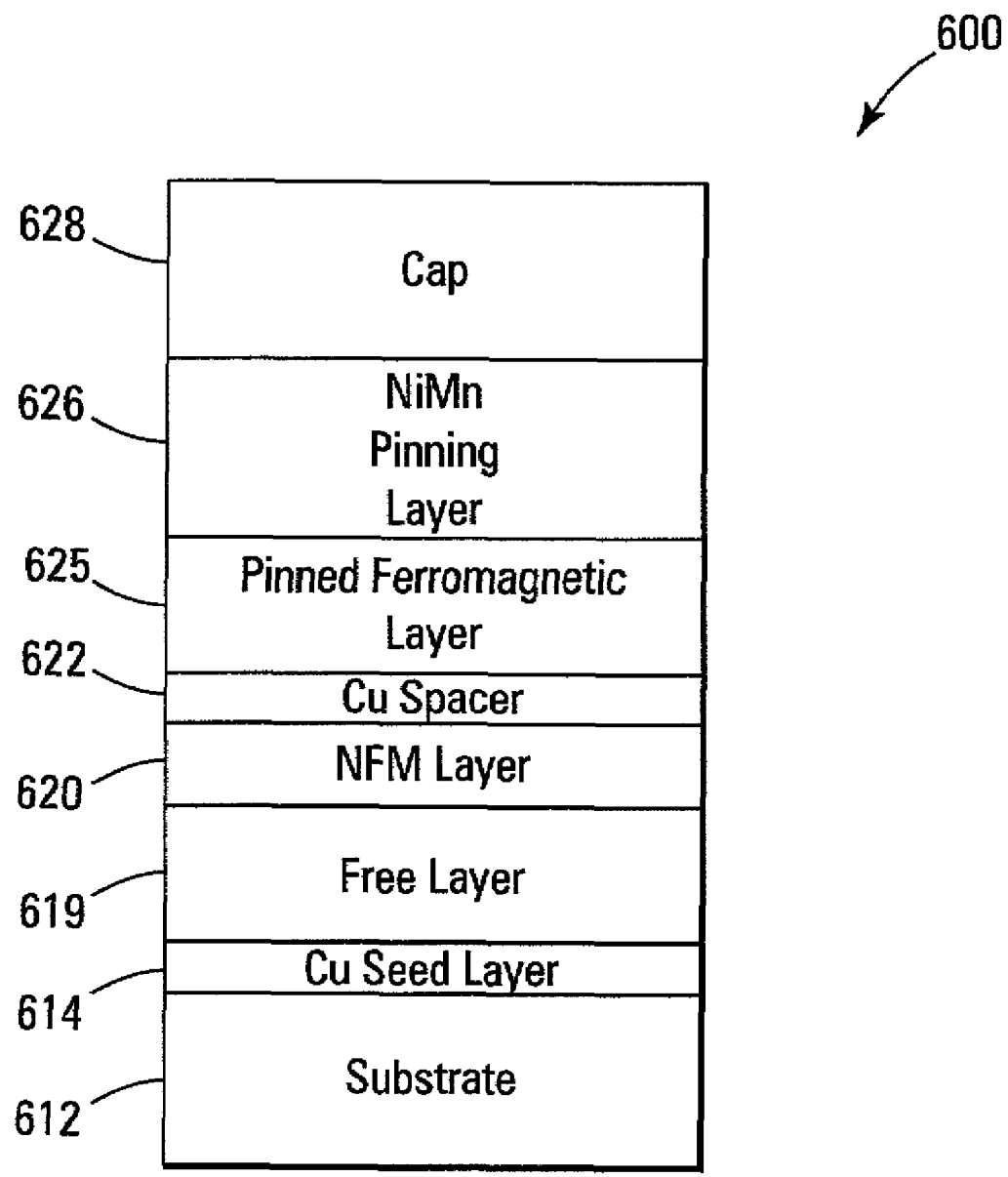
FIG. 6 is a diagrammatic view illustrating one embodiment of a spin valve sensor stack having a pinning layer comprising nickel-manganese.

FIG. 6 is a diagrammatic view illustrating one embodiment of a spin valve sensor stack 600 having a pinning layer comprising nickel-manganese. The spin valve sensors illustrated in the FIG. 6 represent only the spin valve sensor stack. Other layers and features may be added to the spin valve sensor stacks as desired. Spin valve sensor 600 includes substrate 612, oxidized copper (Cu) seed layer 614, unpinned or free ferromagnetic layer 619, which may include a layer of NiFe and CoFe, non-ferromagnetic copper layer 620, a second oxidized copper layer 622, pinned ferromagnetic layer 625, NiMn pinning layer 626 and cap layer 628.

NiMn pinning layer 626 may have a composition of between about 45 and 55 atomic percent Mn and a thickness of between about 80 Å and 200 Å. Cap layer 628 preferably, but not exclusively, includes a thickness of approximately 80 Å. Cap layer 628 maintains the integrity of the structure during subsequent processing.

However, as also described earlier, with increasing Cu seed layer thickness, the ferromagnetic coupling field decreases sharply and stays constant, while the GMR effect increases due to spin filtering effect. Typically the ferromagnetic coupling field of NiMn spin valve heads is difficult to be adjusted unless the Cu spacer thickness is changed. The precise control of magnetic coupling field is important in yielding high performance heads, since the coupling field sensitively affects the head performance such as asymmetry, amplitude and asymmetry uniformity within the wafer.

As the magnetic free layer 619 gets thinner, its thermal stability gets worse by diffusion of adjacent layer atoms into the free layer 619 and the magnetic thickness decreases by an increased ratio of magnetic dead layer to physical thickness. In particular, magnetic anisotropy or the magnetostriction of the free layer 619 is strongly dependent on thickness, type of neighboring atoms and anneal temperature. See for example, Geon Choe "Giant interface magnetostriction and temperature dependence in NiFe films encapsulated with Ta and Al2O3 layers," IEEE Trans. Magn. Vol. 35(5), p3838, 1999. For a very thin free layer 619, effective magnetostriction is given by $\lambda_{eff} = \lambda_b + \lambda_i/(t-t_0)$ where, $\lambda_b$ is bulk magnetostriction, $\lambda_i$ is interfacial magnetostriction, t is film thickness and $t_o$ is magnetic dead layer thickness. Thus, the mangnetostriction in GMR heads plays an important role in influencing the output sensitivity of the head, the stability and the optimum bias point.

As the GMR sensor layer thickness becomes thinner with increasing areal density, control of magnetostriction becomes more difficult due to the combination of giant interfacial magnetostriction dominating over bulk magnetostriction in the thinner free layer 619 and the potentially larger stress concentrated in shorter GMR stripes. Thus, according to the present invention, the copper seed 614 and spacer 622 layers are oxidized. The present invention therefore provides interfacial magnetostriction of free layer that is thermally more stable than the case without oxidation.

FIG. 7 is a table showing the effect of the surface oxidation of the copper layers according to the present invention. FIG. 7 shows the interfacial magnetostriction and bulk magnetostriction for the deposited free layer and the annealed free layer at, for example, 250° C. for 5 hours without oxidation and with copper seed layer and spacer layer oxidation. FIG. 7 demonstrates the interfacial magnetostriction of free layer being thermally more stable than the case without oxidation. Interfacial magnetostriction is strongly affected by interdiffusion between layers and determines the effective magnetostriction that affects asymmetry of GMR head. By oxidizing the copper seed and spacer layers according to the present invention, magnetostriction changes of free layer before and after annealing process can be significantly reduced, indicating an enhanced thermal stability of magnetostriction resulting in more stable GMR head whose asymmetry is less susceptible to thermal processing. Typically, it is difficult to fabricate NiMn spin valve heads with a negative coupling field after high temperature annealing processes because of the interdiffusion of free and pinned layers. However, the present invention may achieve a negative coupling field without affecting GMR effect or resistance.

Figure 8:
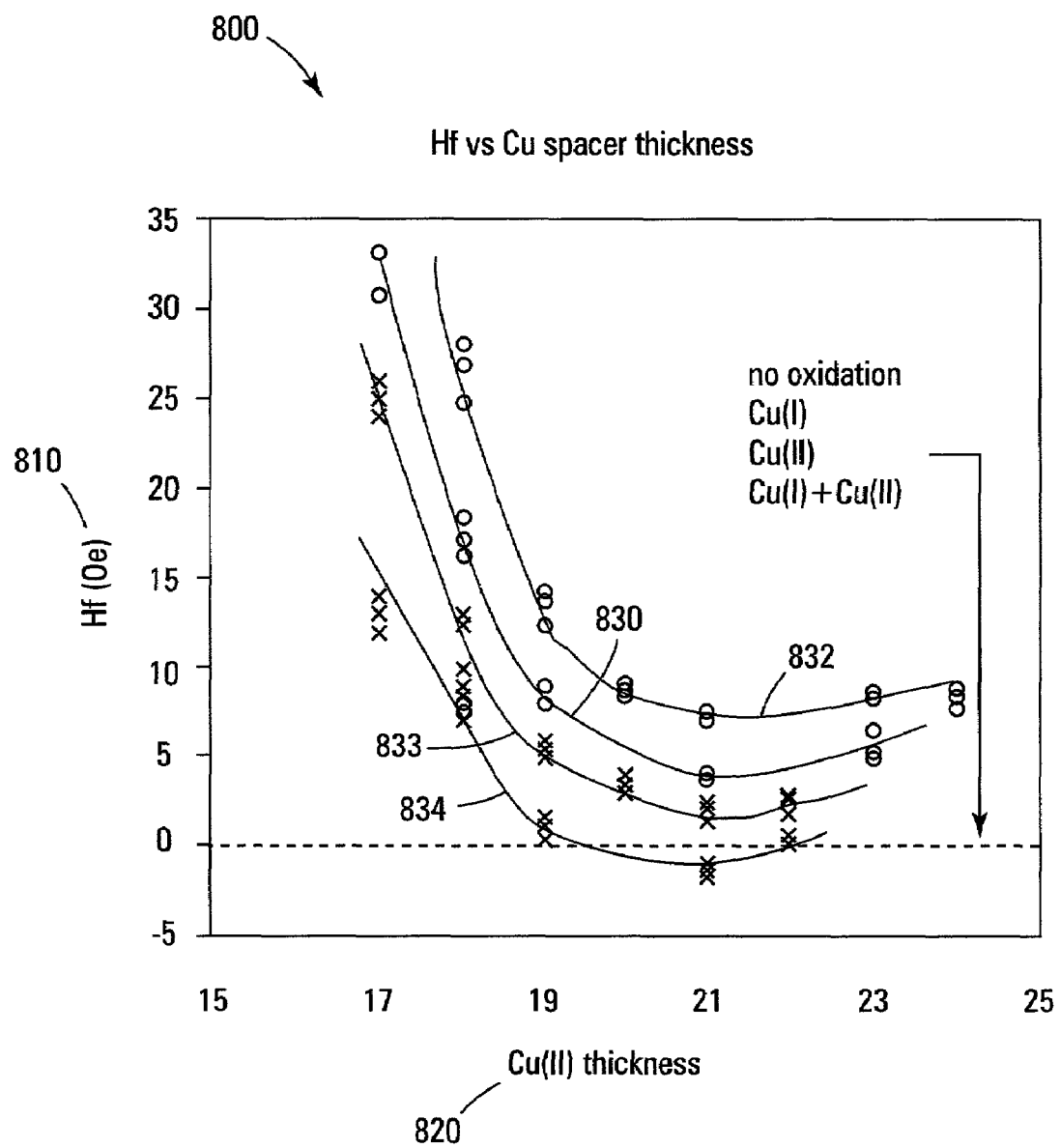
FIG. 8 illustrates the change of the coupling field with Cu spacer thickness.

FIG. 8 is a plot 800 of the change of the coupling field 810 with Cu spacer thickness 820. FIG. 8 shows the plot for an oxidized Cu seed layer 830, a non-oxidized GMR film 832, an oxidized Cu spacer layer 833 and oxidation of both Cu seed and spacer layers 834. The coupling field of GMR films with oxidized Cu seed layer 830 is decreased by 5 Oe compared to non-oxidized GMR films 832 over a wide range of Cu spacer thickness and the coupling field is more decreased with oxidation of both Cu seed and spacer layers 834.

Figure 9:
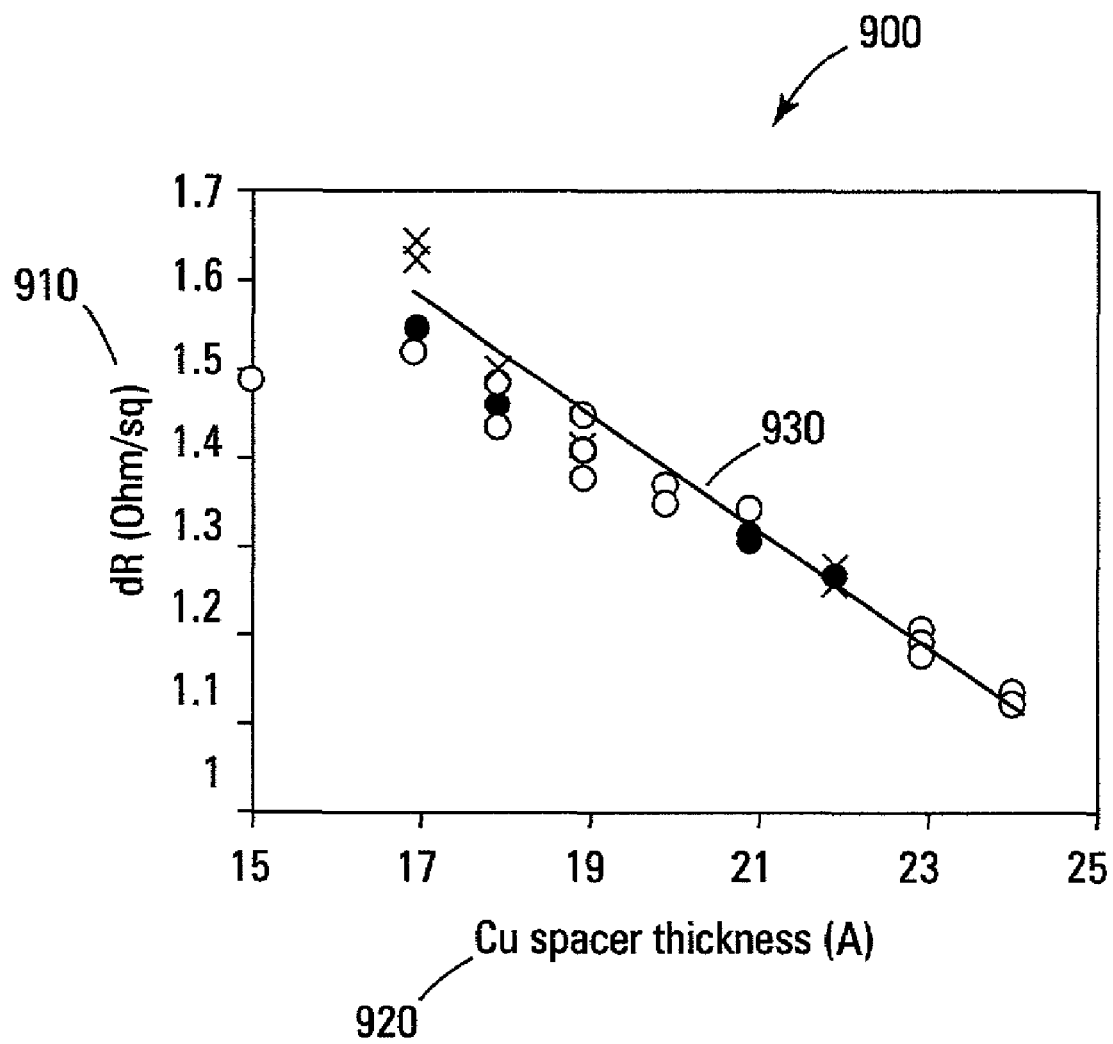
FIG. 9 illustrates the magneto-resistive effect, dR (Ohm/sq), of all types of GMR films as a function of Cu spacer thickness.

FIG. 9 is a plot 900 of the magneto-resistive effect 910, dR (Ohm/sq), of all types of GMR films as a function of Cu spacer thickness 920. Independent of oxidation treatment, the MR values of all the films fit into a linear line 930, indicating that oxidation does not affect the spin polarization effect. From the slope of dR vs. Cu spacer thickness, more than 15% of amplitude increase is expected for NiMn spin valve heads with the Cu seed and spacer layer oxidation method at the same coupling field. Moreover, the amplitude increase may be achieved without affecting asymmetry performance.

Figure 10:
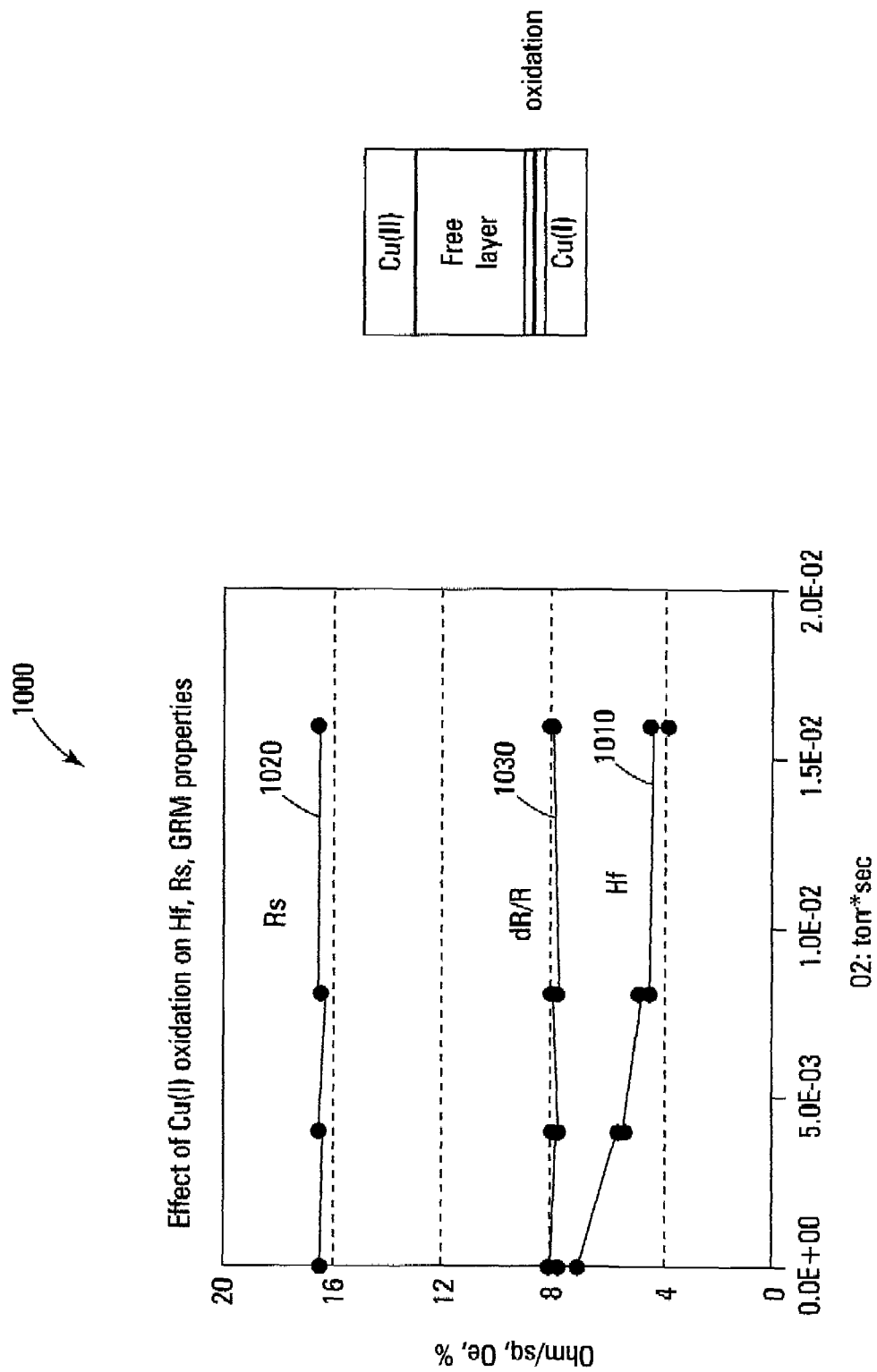
FIG. 10 shows the free-to-pinned layer coupling field versus in-situ Cu surface oxidation of the Cu seed layer.
Figure 11:
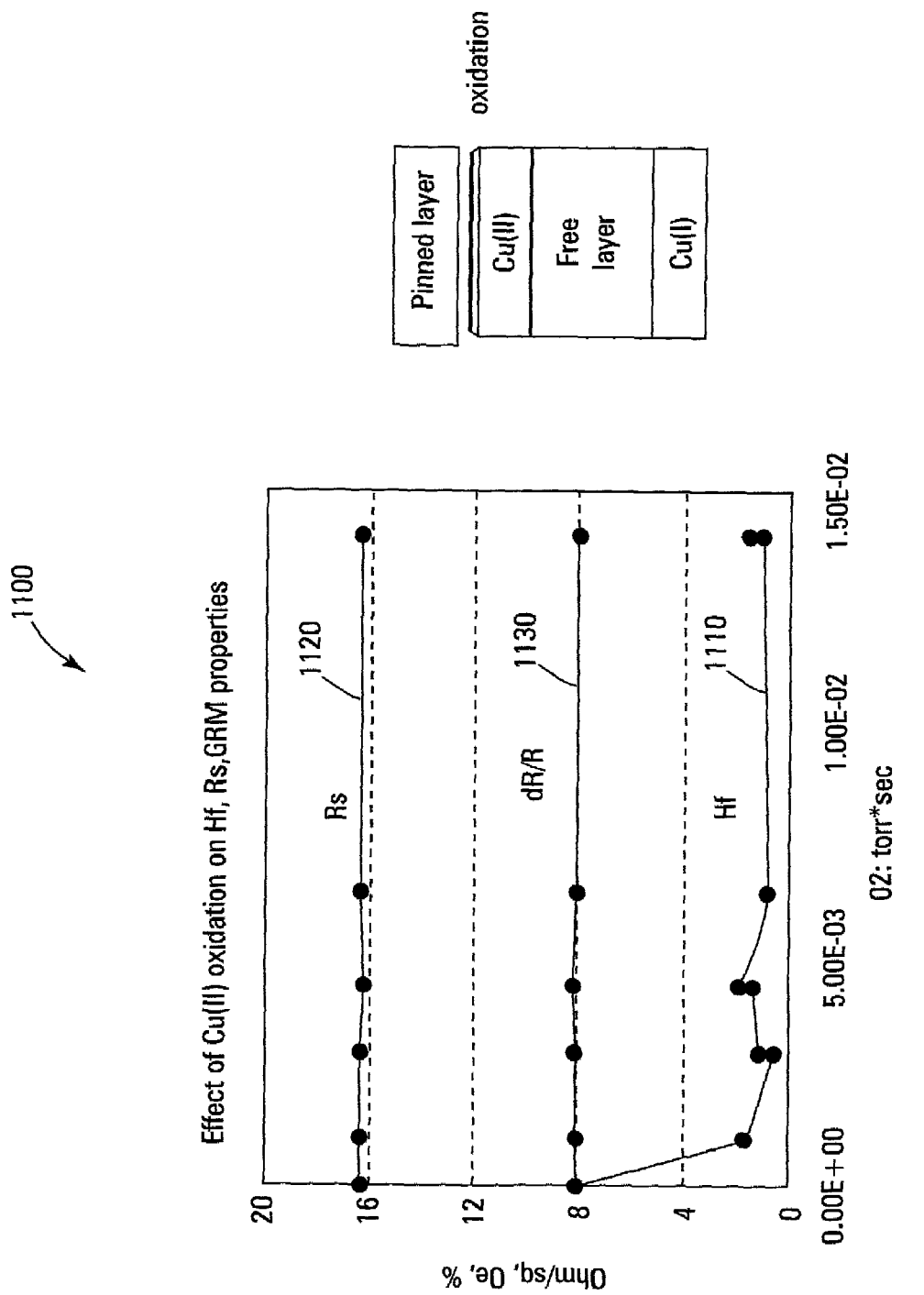
FIG. 11 shows the free-to-pinned layer coupling field versus in-situ Cu surface oxidation of the Cu spacer layer.

FIGS. 10 and 11 show the free-to-pinned layer coupling field versus in-situ Cu surface oxidation of NiMn top spin valve films. In FIG. 10, the effect of oxidation of the Cu seed layer 1000 on $H_f$ 1010, $R_s$ 1020 and GMR effect 1030 is shown for a wide oxidation process. FIG. 11, the effect of oxidation of the Cu spacer layer 1100 on $H_f$ 1110, $R_s$ 1120 and GMR effect 1130 is shown for a wide oxidation process.

Accordingly, the present invention provides a method for providing precise control of magnetic coupling field in NiMn top spin valve heads and amplitude enhancement. The present invention solves the above-described problems with NiMn top spin valves by precisely controlling the magnetic coupling between free and pinned layers by employing the surface oxidation of Cu seed layer or/and Cu spacer layer that improve both the interfacial quality and the crystalline texture.

Figure 12:
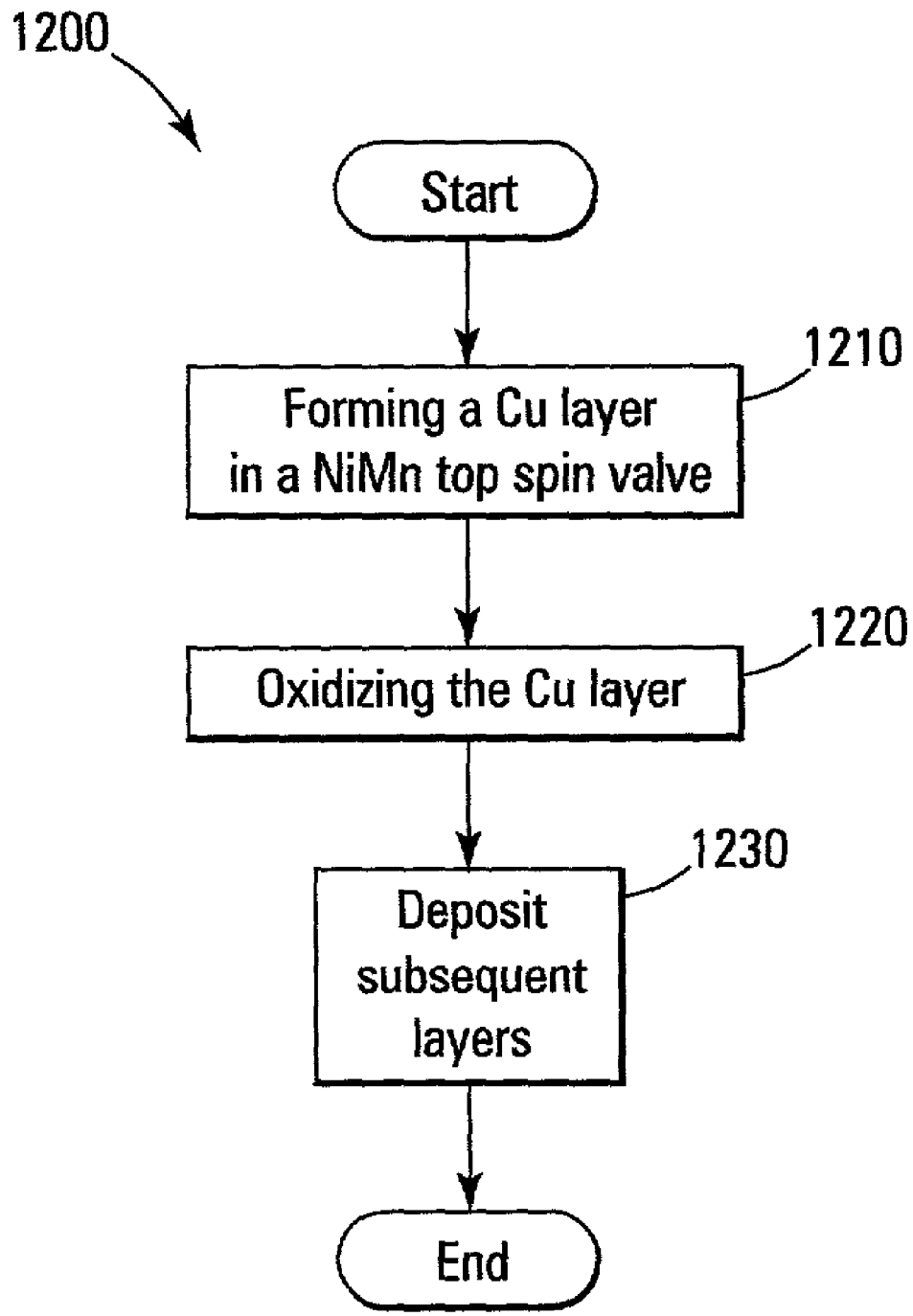
FIG. 12 illustrates a method for providing precise control of magnetic coupling field in NiMn top spin valve heads according to the present invention.

FIG. 12 illustrates a method 1200 for providing precise control of magnetic coupling field in NiMn top spin valve heads according to the present invention. Forming a Cu layer in a NiMn top spin valve 1210. After the Cu layer is formed, e.g. the Cu seed layer and/or Cu spacer layer, it is oxidized 1220. Then subsequent layers are deposited 1230. In a preferred embodiment, a Cu layer is naturally oxidized for 80 seconds under 8×10−5 Torr of oxygen pressure before the subsequent layers were deposited.

The oxidation of the Cu layer reduces the ferromagnetic coupling field without deteriorating GMR effect or resistance. The oxidized Cu seed layer changes the crystalline texture growth of subsequent magnetic layers, resulting in the stronger growth of NiFe(111) and NiMn(111) with respect to NiFe(200) and NiMn(002) phases, while the oxidation of Cu spacer layer appears to improve the interfacial roughness.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for providing precise control of a magnetic coupling field in a NiMn top spin valve head, comprising:
   forming a copper seed layer on a substrate;
   forming a free layer on the copper seed layer;
   forming a non-ferromagnetic layer on the free layer;
   forming a copper spacer layer on the non-ferromagnetic layer;
   forming a pinned ferromagnetic layer on the copper spacer layer; and
   forming a NiMn pinning layer over the pinned ferromagnetic layer;
   wherein the copper seed layer and copper spacer layer are oxidized separately during formation.

2. The method of claim 1, wherein the forming the copper seed layer comprises depositing a layer of copper as a seed layer and, before depositing a next layer, oxidizing the copper seed layer.

3. The method of claim 2, wherein the forming the copper spacer layer comprises depositing a layer of copper as a spacer layer and, before depositing a next layer, oxidizing the copper spacer layer.

4. The method of claim 1, wherein the forming the copper spacer layer comprises depositing a layer of copper as a spacer layer and, before depositing a next layer, oxidizing the copper spacer layer.

5. The method of claim 1, wherein the copper seed layer and oxidized spacer layer are naturally oxidized for 80 seconds under 8×10−5 Torr of oxygen pressure.

6. The method of claim 1, wherein the oxidized copper seed layer and oxidized spacer layer reduce the ferromagnetic coupling field without deteriorating GMR effect or resistance.

7. The method of claim 1, wherein the oxidized copper seed layer and oxidized spacer layer provide a negative coupling field without affecting GMR effect or resistance.

8. The method of claim 1, wherein the oxidized copper seed layer and oxidized spacer layer change the crystalline texture growth of subsequent layers.

9. The method of claim 1, wherein the oxidized copper seed layer and oxidized spacer layer provide a negative coupling field that is achieved without affecting a GMR effect or resistance of the NiMn top spin valve head.

10. The method of claim 9, wherein the oxidized copper seed layer and oxidized spacer layer provide stronger growth of NiFe(111) and NiMn(111) with respect to NiFe(200) and NiMn(002) phases.

11. The method of claim 1, wherein the oxidized copper seed layer and oxidized spacer layer improve the interfacial roughness.

12. The method of claim 1, wherein the oxidation of the copper seed layer and spacer layer does not affect asymmetry performance.

* * * * *

UNITED STATES PATENT AND TRADEMARK OFFICE
CERTIFICATE OF CORRECTION

PATENT NO. : 7,038,891 B2 Page 1 of 1
APPLICATION NO. : 10/038125
DATED : May 2, 2006
INVENTOR(S) : Choe It is certified that error appears in the above-identified patent and that said Letters Patent is hereby corrected as shown below:

On Cover, In Title of Invention:

Line 3: "NIMN" should read -- $N_iM_N$ --

In Title of Invention before Background of the Invention:

Col. 1, line 3: "NIMN" should read -- $N_iM_N$ --

In Summary of the Invention:

Col. 6, line 42: "thereon," should read -- thereon. --
Col. 6, line 42: "Another" should begin with a new paragraph Signed and Sealed this Fifteenth Day of August, 2006

JON W. DUDAS
*Director of the United States Patent and Trademark Office*